United States Patent
Dose et al.

(10) Patent No.: US 9,591,866 B2
(45) Date of Patent: Mar. 14, 2017

(54) STABLE FROZEN AERATED PRODUCTS MANUFACTURED BY LOW-TEMPERATURE EXTRUSION TECHNOLOGY

(75) Inventors: Steffen Dose, Bakersfield, CA (US); Maylis Quessette, Cessy (FR); Wilhelm Karl Silberzahn, Mainz (DE)

(73) Assignee: Nestec S.A., Vevey (CH)

( * ) Notice: Subject to any disclaimer, the term of this patent is extended or adjusted under 35 U.S.C. 154(b) by 373 days.

(21) Appl. No.: 13/139,568

(22) PCT Filed: Nov. 25, 2009

(86) PCT No.: PCT/EP2009/065793
§ 371 (c)(1),
(2), (4) Date: Jun. 14, 2011

(87) PCT Pub. No.: WO2010/069727
PCT Pub. Date: Jun. 24, 2010

(65) Prior Publication Data
US 2011/0244104 A1 Oct. 6, 2011

(30) Foreign Application Priority Data
Dec. 15, 2008 (EP) .................... 08171666

(51) Int. Cl.
| A23L 3/00 | (2006.01) |
| A23G 9/14 | (2006.01) |
| A23G 9/34 | (2006.01) |
| A23G 9/42 | (2006.01) |
| A23G 9/46 | (2006.01) |

(52) U.S. Cl.
CPC .............. *A23G 9/14* (2013.01); *A23G 9/34* (2013.01); *A23G 9/42* (2013.01); *A23G 9/46* (2013.01); *A23L 29/212* (2016.08); *A23L 29/231* (2016.08); *A23P 30/20* (2016.08)

(58) Field of Classification Search
CPC ................. A23G 9/14; A23L 29/231
See application file for complete search history.

(56) References Cited

U.S. PATENT DOCUMENTS

| 5,215,777 A | 6/1993 | Asher et al. |
| 2006/0115564 A1* | 6/2006 | Passarelli et al. ............ 426/481 |
| 2008/0050495 A1* | 2/2008 | Vieira et al. .................. 426/566 |

FOREIGN PATENT DOCUMENTS

| EP | 0 600 670 | 6/1994 |
| EP | 1 510 134 | 3/2005 |
| WO | 9803079 | 1/1998 |
| WO | WO 9809536 A1 * | 3/1998 | ............... A23G 9/20 |
| WO | 0049883 | 8/2000 |
| WO | 03015530 | 2/2003 |
| WO | 2006099987 | 9/2006 |

OTHER PUBLICATIONS

"Carboxymethylcellulose", retrieved online on May 7, 2013 from www.befoodsmart.com. pp. 1-2.*
Ward, "Stabilizers, Naturally". Retrieved online from foodproductdesign.com, as of Oct. 1, 2007. pp. 1-6.*
"Guar Gum". Retrieved online from www.guargum.biz, as of 2006 copyright (no month). pp. 1-2.*
Thompkins, "Gum Arabic: Sudan's Miracle Commodity". Retrieved online from wbur.org/npr/11224050, as of Jun. 20, 2007. pp. 1-8.*
"Fat Structure Development in Low Temperature Extruded Ice Cream". Dissertation ETH No. 16757. Published 2006 (no month), Laboratory of Food Process Engineering (ETH Zurich). pp. 1-200.*

* cited by examiner

*Primary Examiner* — Jenna A Watts
(74) *Attorney, Agent, or Firm* — K&L Gates LLP

(57) ABSTRACT

The present invention relates to stable frozen aerated products manufactured by low-temperature extrusion. In particular, the invention is concerned with a stabilizer system comprising native starch which can be used to impart stability on low-temperature extruded frozen products. A method of producing such frozen aerated confectionery product and the products obtainable from said method are also part of the present invention.

14 Claims, No Drawings

STABLE FROZEN AERATED PRODUCTS MANUFACTURED BY LOW-TEMPERATURE EXTRUSION TECHNOLOGY

FIELD OF THE INVENTION

The present invention relates to stable frozen aerated products manufactured by low-temperature extrusion. In particular, the invention is concerned with a stabiliser system comprising native starch which can be used to impart stability on low-temperature extruded frozen products. A method of producing such frozen aerated confectionery product and the products obtainable from said method are also part of the present invention.

BACKGROUND OF THE INVENTION

Low-temperature extrusion or low-temperature freezing is a technology that has been recently developed and which has been used to confer enhanced organoleptic properties to frozen confectionery product. Examples of such frozen confectionery include ice cream, frozen milk shake, frozen yogurt, sorbet etc.

Such a method is described for instance in WO 2005/070225, WO 2006/099987, EP 0713650, U.S. Pat. No. 7,261,913 and more recently US 2007/0196553.

The products obtained by low-temperature extrusion have a particular microstructure as extensively described in Ph.D. Dissertation of Wildmoser J. submitted to the Swiss Federal Institute of Technology Zürich, 2004, "Impact of Low Temperature Extrusion Processing on Disperse Microstructure in Ice Cream Systems".

Such products usually when aerated require stabilisation during and after production in order to render the products marketable. Conventional stabiliser and/or emulsifier systems have been traditionally used to give such products adequate stability.

However, these traditionally used ingredients are often seen as additives by the consumer and detract from a natural, healthy image which would be more appealing to the consumers.

EP 1400176 describes a conventional manufacturing process for frozen products comprising no traditional stabiliser or emulsifier. The traditional stabilisers or emulsifiers are replaced by soluble and insoluble fibres. However, it does not concern low-temperature extrusion methods of manufacture.

It would therefore be advantageous to develop a stabiliser system which can be used in low-temperature extrusion processes and which does not require non-natural additives. This poses a great challenge as not only should the product be stable under the processing conditions at varying overruns, but it should also maintain the superior sensory profile attributed to low-temperature extruded frozen aerated products.

OBJECT OF THE PRESENT INVENTION

It is thus an object of the present invention to provide a frozen confectionery product which does not require non-natural ingredient and has excellent organoleptic and texture properties.

SUMMARY OF THE INVENTION

The object is solved by means of the independent claims. The dependent claims further develop the central idea of the invention.

Thus, in a first aspect, the present invention relates to a low-temperature extruded frozen confectionery product comprising a stabiliser system comprising native starch, preferably selected from tapioca, maize or rice starch. Using this stabiliser system, non-natural additives are not required.

In a further aspect, the invention pertains to the use of a stabiliser system comprising native starch, preferably selected from tapioca, maize or rice starch, for manufacturing a low-temperature extruded frozen confectionery product.

A method of producing an aerated frozen confectionery product comprising the steps of:

a. Producing an ingredient mix comprising optionally fat, preferably in an amount of 0-20%, milk solids non-fat, preferably in an amount of 5-15%, sugars, preferably in an amount of 10-30%, and a stabiliser system, preferably in an amount of 0.1-6%, said stabiliser system comprising native starch, preferably selected from tapioca, maize or rice starch,
b. Homogenising and pasteurising the mix,
c. Aerating and pre-freezing the mix,
d. Cooling the mix to a temperature below −11° C. in a screw extruder,
e. Optionally hardening the mix by deep-freezing at a temperature below −20° C., preferably below −35° C.

to give said aerated frozen confectionery product, and the products obtainable by this method also form part of the present invention.

DETAILED DESCRIPTION OF THE INVENTION

In the following description, the % values are in wt % unless otherwise specified.

The present invention relates in a first aspect to frozen aerated confectionery products which have been produced by low-temperature extrusion. This step of low-temperature extrusion or low-temperature freezing may be carried out in a single or twin extruder.

Low-temperature extrusion is a known process which imparts a specific microstructure to the final product. Products obtained by such process are described in US 2007/0196553, the content of which is here-included by reference. For instance, ice crystal size and air bubble size tend to be smaller than in traditional manufacturing processes. Ice crystals, air cells, fat globules and agglomerates thereof shall be in a specific diameter range in order to enhance positive sensory and stability characteristics. Thus, in the products of the invention at least 50% in number of ice crystals/ice crystal agglomerates preferably in a size range between 5 and 30 microns (or mean value below 8-10 microns) together with a low degree of ice crystal interconnectivity improve scoop ability and creaminess. At least 50% in number of air cells preferably in the diameter range between 2-10 microns (or mean value below 8-10 microns) delays bubble coarsening by coalescence during melting in the mouth so strongly, that creaminess sensation is significantly enhanced. The volume of fat globules/fat globules agglomerates preferably in the size range between 2-20 microns have a significant direct impact on improving creaminess sensation in the mouth and also contribute to increased air cell structure stability against coalescence thus supporting also indirectly the creaminess attribute.

These size measurements can be carried out by methods known to the skilled person. For instance, ice crystal size and air bubble size can be measured using optical microscopy and fat particle size analysis can be carried out by laser light scattering.

Low-temperature extruded products thus have a smooth mouthfeel and particularly appealing textural and organoleptic properties.

By "frozen aerated confectionery product" is meant any aerated product such as ice cream, sorbet, mellorine, milk shake, any frozen dessert etc.

The products of the invention may be aerated to an overrun of preferably at least 40%, more preferably at least 90%. In a preferred embodiment, the overrun is up to 150%. Most preferably, the overrun is 100-120%.

By "stabiliser system" is to be understood a mixture of ingredients which contributes to the stability of the frozen product with respect to ice crystal formation, heat shock resistance, overall texture properties etc. Thus, the stabiliser system may comprise any ingredients which are of structural importance to the frozen confectionery.

This stabiliser system may comprise ingredients which render the texture creamier, or natural emulsifying ingredients which overall contribute to the advantageous textural, structural, organoleptic properties of the product.

The stabiliser system of the invention is particularly advantageous as it allows the manufacture of stable frozen confectionery without resorting to artificial ingredients such as stabilisers and emulsifiers traditionally used in the art.

The products of the invention comprise a stabiliser system comprising at least native starch. By native starch is meant starch which has not undergone any chemical modification.

Preferably, the native starch is selected from tapioca, maize or rice starch.

The inventors have surprisingly found that starch is particularly effective in a stabiliser system for low-temperature extruded products. This is surprising since the high shear stresses used in low-temperature extrusion processes have been reported to destroy native starch by increasing granular breakdown and consequently decrease the viscosity. This is known to have a negative impact on the shelf-life stability of the final product. However, according to the present invention, the presence of starch in low-temperature extrusion products unexpectedly contributes to their stability.

Thus, it was found by the present inventors that a natural stabiliser system can be used in low-temperature extruded products and provides surprisingly good stability. The resulting products further have the advantage that they comprise only natural ingredients and can be used in green label, natural frozen confectionery.

By "natural ingredients" are meant ingredients of natural origin. These include ingredients which come directly from the field, animals, etc. or which are the result of a physical or microbiological/enzymatic transformation process. These therefore do not include ingredients which are the result of a chemical modification process.

Examples of non-natural ingredients which are avoided in the present invention include for example mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin.

Chemically modified starches which are used in the art as stabilisers are also avoided. These include for example oxidised starch, monostarch phosphate, distarch phosphate, phosphated or acetylated distarch phosphate, acetylated starch, acetylated distarch afipate, hydroxy propyl starch, hydrosypropyl distarch phosphate, acetylated oxidised starch.

The use of natural products as stabilisers in low-temperature extruded products is particularly challenging due to the requirements of low-temperature extrusion processes and the wide range of overrun which is desired. Surprisingly, it was found that the stabiliser system works particularly well at overruns of at least 40%, preferably at least 90%, optionally up to 150%, more preferably 100-120%.

The stabiliser system used in the products of the invention preferably further comprises fibres from vegetables, fruits or mixtures thereof.

By fruit fibres it to be understood fibres obtainable by any fruit or mixtures of fruits. They may be provided in the form of pieces of the fruit itself, fruit extracts, fruit juice, fruit puree, fruit concentrate etc. Suitable fruits include apple, lemon, banana, blackberry, blackcurrant, blueberry, cherry, pomegranate, pumpkin, cranberry, gooseberry, grapes, guava, kiwi, mango, orange, papaya, passion fruit, peach, pear, pineapple, plums, raspberry, redcurrant, strawberry, tomato, etc.

By vegetable fibres is to be understood fibres obtainable by any plant source other than a fruit. These may include beans, Brussels sprouts, carrot, cauliflower, celery, onions, sugar beet, potato, cabbage, bamboo etc.

Preferably, the fibres are citrus fibres.

When fibres are used, these are preferably in an expanded form. Expanded fibres are fibres which have undergone an "activation" step, for example by high energy processing of the fibres in a solvent. Such high energy processing may be high pressure homogenisation and/or high shear mixing. Thus, the three-dimensional structure of the fibres is modified in that the surface area of the fibres is increased.

Expanded fibres, i.e. fibres with higher surface area provide improved functionality and confer better thickening properties, freeze-thaw, heat and/or foam stability to the compositions in which they are present.

Additionally, the stabiliser system used in the present products preferably also comprises natural emulsifiers.

Non-natural emulsifiers such as mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin, are not part of the present invention.

Natural emulsifiers include for example egg yolk, buttermilk, raw acacia gum, rice bran extract or mixtures thereof. The natural emulsifiers have the advantage of conferring to the finished product a smoother texture and stiffer body which reduce the whipping time. The presence of natural emulsifiers results in air cells that are smaller and more evenly distributed throughout the internal structure of the ice cream. Preferably, the natural emulsifier used in the present stabiliser system is egg yolk.

Further, it has been found that the combination of native starch, citrus fibres and a natural emulsifier, preferably egg yolk, is particularly effective at stabilising low-temperature extruded products.

A low-temperature extruded frozen aerated confectionery product comprising at least 0.1% native starch, at least 0.1% fibres and at least 0.5% natural emulsifier according to a preferred embodiment of the invention has been found to show adequate stability while not requiring the use of conventional additives such as chemical emulsifiers and/or traditional stabilisers.

Preferably, the amount of native starch in the frozen confectionery product is 0.1-6%, more preferably 0.1-3%, even more preferably 0.2-2%, most preferably about 0.3%.

The amount of fibres in the present products is preferably 0.1-2%, more preferably 0.1-0.8%, most preferably about 0.7%.

The natural emulsifier is preferably present in the products of the invention in an amount of 0.5-6%, preferably about 2%.

The composition of the product typically comprises 0-20% fat, 5-15% milk solids non-fat, and 10-30% sugars. In an embodiment, fat is present in an amount of 3-15%, preferably 3-8%. Fat may be dairy fat and/or vegetable fat.

The product may additionally comprise flavourings or colourings. Such flavourings or colourings, when used, are selected from natural ingredients to keep in with the natural image of the product of the invention. Inclusions may also be present in the products of the invention. Natural inclusions may include for example fruit pieces, nuts, etc.

The invention thus relates in a further aspect to the use of a stabiliser system comprising native starch for manufacturing a low-temperature extruded frozen confectionery product.

Such a stabiliser system offers the unexpected advantage that it can confer to the frozen confectionery product adequate stability while avoiding the use of traditionally used stabilisers and/or emulsifiers.

Native starch may be selected from tapioca, maize or rice starch.

Preferably, the stabiliser system further comprises fibres from vegetables, fruits or mixtures thereof. The fibres are preferably citrus fibres.

Additionally, the stabiliser may comprise a natural emulsifier.

In a most preferable embodiment, the stabiliser system comprises native starch, citrus fibres and a natural emulsifier, preferably egg yolk.

A method for producing the products of the invention also forms part of the invention.

In a first step, the method comprises the step of producing an ingredient mix comprising optionally fat, milk solids non-fat, sugars and a stabiliser system comprising at least native starch, preferably selected from tapioca, maize or rice starch.

Typically, the ingredient mix comprises 0-20% fat, 5-15% milk solids non-fat, 10-30% sugars and 0.1-6% of a stabiliser system comprising native starch.

Preferably, the stabiliser system further comprises fibres from fruits and/or vegetables. Additionally, natural emulsifiers, in particular egg yolk, may also form part of the stabiliser system.

The ingredient mix is prepared by blending all ingredients according to traditional frozen confectionery manufacturing methods. Alternatively, if fibres are present, these may be activated first prior to inclusion in the ingredient mix.

The mix is then pasteurised under standard conditions. Pasteurisation may be carried out prior or after homogenisation. Typical pasteurisation conditions include heating to about 80 to 90° C. for 10 to 30 s.

Homogenisation is preferably carried out under standard conditions, namely at a pressure of between 40 and 200 bars, preferably between 100 and 150 bars, more preferably between 120 and 140 bars.

According to an embodiment of the invention, homogenisation may be carried out in at least one stage at a pressure of 150-250 bars, preferably 180-250 bars, more preferably 200-230 bars. Preferably, the homogenisation is carried out in two stages, the first stage being at the pressures described above. The second stage is then carried out at pressures between 10-80 bars. The high pressure homogenisation has the additional effect of activating the fibres, if present, to have them in an expanded form.

The homogenised mix may then be cooled to around 2 to 8° C. by known means. The mix may further be aged for 4 to 24 h at around 2 to 6° C. with or without stirring. Optionally, the addition of flavourings, colourings, etc. may be carried out prior to the ageing step. If flavourings, colourings, etc. are added, these are selected from natural ingredients only.

In the next step, the mix is aerated and pre-frozen, preferably in a conventional ice cream freezer such as a cooled scraped surface heat exchanger to temperatures between −4.5 to −8° C.

The frozen confectionery is preferably aerated to an overrun at least 40%, more preferably at least 90%. The overrun is preferably up to 150%. Most preferably, the overrun is 100-120%. Indeed, the use of a stabiliser system according to the invention surprisingly allows the production of stable aerated products having a high overrun. The stabiliser system has even been found to work especially well in frozen products having an overrun of up to 150%.

The aerated and pre-frozen mix is then subjected to low-temperature extrusion. Thus, the mix is cooled by extrusion at a temperature of below −11° C., preferably between −12° C. and −18° C. in a screw extruder. The screw extruder may be such as that described in WO 2005/070225.

Preferably, the extrusion is performed in a single or twin screw extruder.

The frozen mix may then be packaged and hardened. This optional hardening step may be carried out at a temperature of below −35° C.

The method of the invention thus lends itself to the manufacture of frozen confectionery which is natural and does not contain any artificial ingredients or non-natural ingredients etc. The products are also shelf-life stable and have excellent organoleptic and textural properties.

As starch is normally sensitive to high shear stresses, it is furthermore surprising that native starch is compatible with the shear stresses as used in the low-extrusion temperature manufacturing method. However, the present invention has found that the present manufacturing conditions surprisingly produce stable products and products which have good creaminess, texture and organoleptic properties.

The method further surprisingly works well with low amounts of fat, e.g. 3%. In that way, the method enables the production of fat reduced frozen aerated confectionery products consisting of natural ingredients only and providing excellent organoleptic properties as well as the required shelf life stability characteristics.

The frozen aerated confectionery products obtainable by the present method also form part of the invention.

Thus, the present invention proposes a new way in which a natural frozen confectionery product which is stable and organoleptically appealing may be manufactured without resorting to artificial or non-natural ingredients. Standard stabiliser/emulsifier systems which comprise chemically synthesised or chemically modified compounds are dispensed with, which provides a more appealing product to the consumer.

The present invention is illustrated further herein by the following non-limiting examples.

EXAMPLES

Example 1

A vanilla ice cream of the invention was manufactured under the following conditions:

Sugar, milk fat, MSNF and native tapioca starch were blended with water using a high speed blender. Homogenisation in two stages, firstly at above 180 bars, secondly at 50 bars was carried out at 78° C. followed by continuous pasteurisation using a high temperature short time (HTST) heat exchanger. After pasteurisation, vanilla extract was then added to the mix prior to ageing at 3° C. for 6 hours. The mix was then aerated to an overrun of 110% and cooled down to a temperature of −6° C. within a conventional ice cream freezer. The aerated and partially frozen mix was then transferred to a twin screw extruder where it was cooled to a temperature of −15° C. The extruded product was then packaged and hardened at −35° C. Finally, the product was stored at −25° C.

The ice confectionery product showed excellent shelf-life stability, as well as good textural and organoleptic properties.

Example 2

A product according to the invention was manufactured and has the following composition:

| Ingredient | Wt % of final product |
|---|---|
| Fat | 3-8 |
| Sugar | 20-25 |
| MSNF | 12-15 |
| Egg yolk | 1-3 |
| Starch | 0.1-1.8 |
| Citrus fibres | 0.5-0.9 |
| Total solids | 35-45 |

The invention claimed is:

1. A low-temperature extruded frozen aerated confectionery product comprising a stabilizer system comprising a native starch, citrus fibers, and a natural emulsifier, and the low-temperature extruded frozen aerated confectionery product consists of only natural ingredients and comprises 0.1-6% of the native starch, 0.1-2% of the citrus fibers, and 0.5-6% of natural emulsifier by weight, wherein the product is extruded at a temperature below −11° C.

2. The low-temperature extruded frozen aerated confectionery product according to claim 1, comprising ice crystals/ice crystal agglomerates, wherein at least 50%, by number, of the ice crystals/ice crystal agglomerates have a size of between 5 and 30 microns.

3. The low-temperature extruded frozen aerated confectionery product according to claim 1, wherein at least 50%, by number, of air cells have a diameter of between 2 and 10 microns.

4. The low-temperature extruded frozen aerated confectionery product according to claim 1, comprising 0.1% native starch, 0.1% citrus fibers and 0.5% natural emulsifier by weight.

5. The low-temperature extruded frozen aerated confectionery product according to claim 1, comprising 0-20% fat, 5-15% MSNF, and 10-30% sugars by weight.

6. The low-temperature extruded frozen aerated confectionery product according to claim 1, wherein the native starch is selected from the group consisting of tapioca, maize and rice starch.

7. The low-temperature extruded frozen aerated confectionery product according to claim 1, wherein the natural emulsifier is selected from the group consisting of egg yolk, buttermilk, raw acacia gum, rice bran extract and mixtures thereof.

8. The low-temperature extruded frozen aerated confectionery product according to claim 1, comprising 0.1-3.0% of the native starch, 0.1-0.8% of the citrus fibers, and 0.5-6% of the natural emulsifier by weight.

9. The low-temperature extruded frozen aerated confectionery product according to claim 1, comprising 0.3% of the native starch, 0.7% of the citrus fibers, and 2% of the natural emulsifier by weight.

10. A method for manufacturing a low-temperature extruded frozen confectionery product comprising using a stabilizer system comprising a native starch, citrus fibers, and a natural emulsifier to produce the low-temperature extruded frozen confectionery product comprising 0.1-6% of the native starch, 0.1-2% of the citrus fibers, and 0.5-6% of the natural emulsifier by weight, wherein the low-temperature extruded frozen confectionery product consists of only natural ingredients, and wherein the product is extruded at a temperature below −11° C.

11. A method of producing an aerated frozen confectionery product, the method comprising the steps of:
producing an ingredient mix comprising fat in an amount of 0-20%, milk solids non-fat, sugars, and a stabiliser system comprising a native starch, citrus fibers, and a natural emulsifier;
homogenising and pasteurising the ingredient mix;
aerating and pre-freezing the ingredient mix; and
extruding the ingredient mix at a temperature below −11° C. in a screw extruder to produce the aerated frozen confectionery product comprising 0.1-6% of the native starch, 0.1-2% of the citrus fibers, and 0.5-6% of the natural emulsifier by weight, wherein the aerated frozen confectionery product consists of only natural ingredients.

12. The method according to claim 11, wherein the extrusion is performed in a single or twin screw extruder.

13. The method according to claim 11, comprising the step of:
hardening the ingredient mix by deep-freezing at a temperature below −20° C.

14. An aerated frozen confectionery product obtained by producing an ingredient mix comprising fat in an amount of 0-20% by weight, milk solids non-fat, sugars, and a stabilizer system comprising a native starch, citrus fibers, and a natural emulsifier; homogenizing and pasteurizing the ingredient mix; aerating and pre-freezing the ingredient mix; and extruding the ingredient mix at a temperature below −11° C. in a screw extruder to produce the aerated frozen confectionery product consisting of only natural ingredients and comprising 0.1-6% of the native starch, 0.1-2% of the citrus fibers, and 0.5-6% of the natural emulsifier by weight.

* * * * *